(No Model.) 2 Sheets—Sheet 1.
C. J. ABBOTT.
HAND GARDEN CULTIVATOR.

No. 536,251. Patented Mar. 26, 1895.

WITNESSES. INVENTOR
Jas. B Clarke C. J. Abbott
M. M. Morton by E. H. Bates Attorney.

(No Model.) 2 Sheets—Sheet 2.
C. J. ABBOTT.
HAND GARDEN CULTIVATOR.
No. 536,251. Patented Mar. 26, 1895.

UNITED STATES PATENT OFFICE.

CHARLES J. ABBOTT, OF GREENVILLE, MICHIGAN, ASSIGNOR TO THE GREENVILLE IMPLEMENT COMPANY, OF SAME PLACE.

HAND GARDEN-CULTIVATOR.

SPECIFICATION forming part of Letters Patent No. 536,251, dated March 26, 1895.

Application filed January 14, 1895. Serial No. 534,841. (No model.)

*To all whom it may concern:*

Be it known that I, CHARLES J. ABBOTT, a citizen of the United States, residing at Greenville, in the county of Montcalm and State of Michigan, have invented certain new and useful Improvements in Hand Garden-Cultivators; and I do hereby declare the following to be a full, clear, and exact description of the invention, such as will enable others skilled in the art to which it appertains to make and use the same.

This invention relates to improvements in garden cultivators of the class drawn or forced by the hands of the operator and it consists in the novel construction, combination and arrangement of parts of which it is composed as will be hereinafter fully described and pointed out in the appended claims.

The annexed drawings, to which reference is made, fully illustrate my invention, in which—

Figure 1:
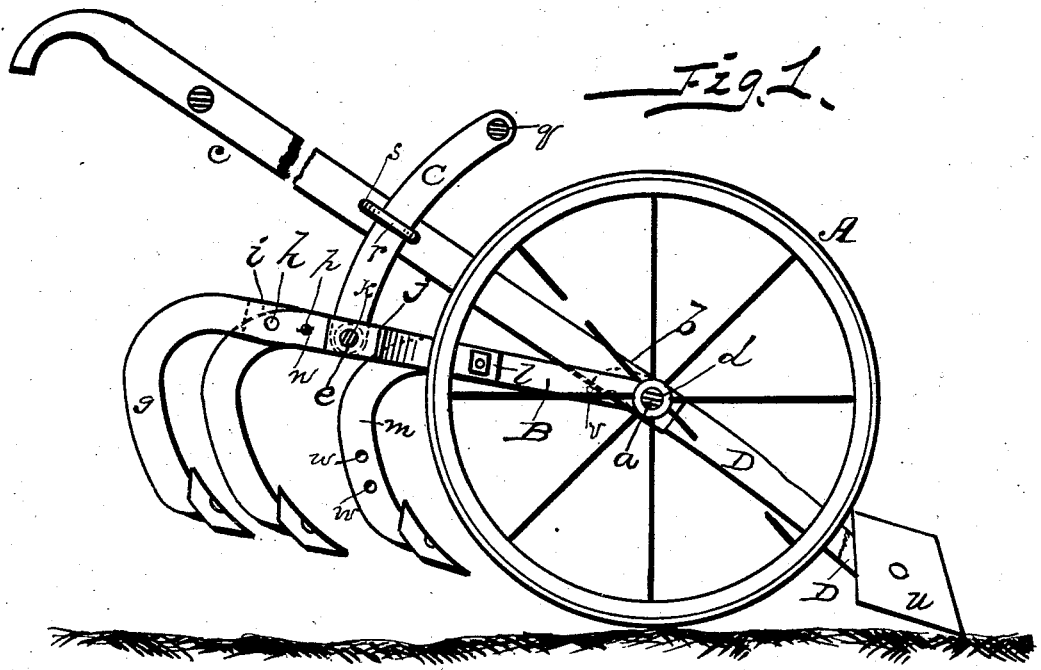
Figure 2:
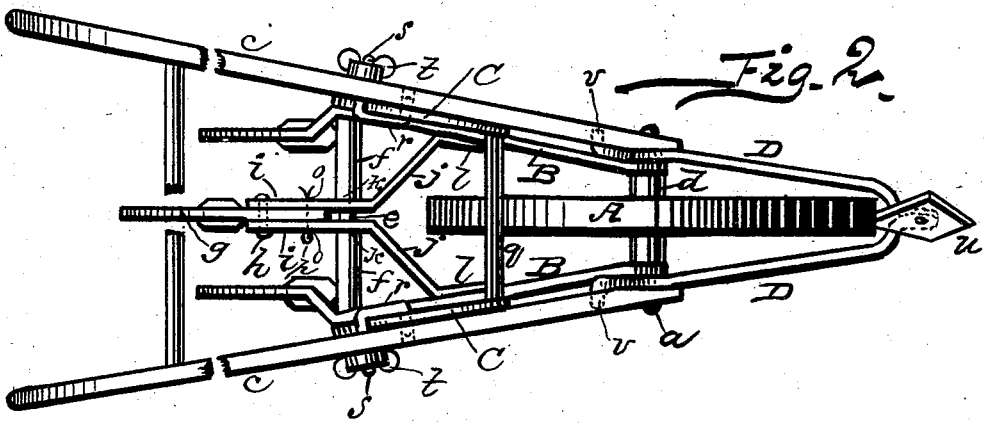
Figure 3:
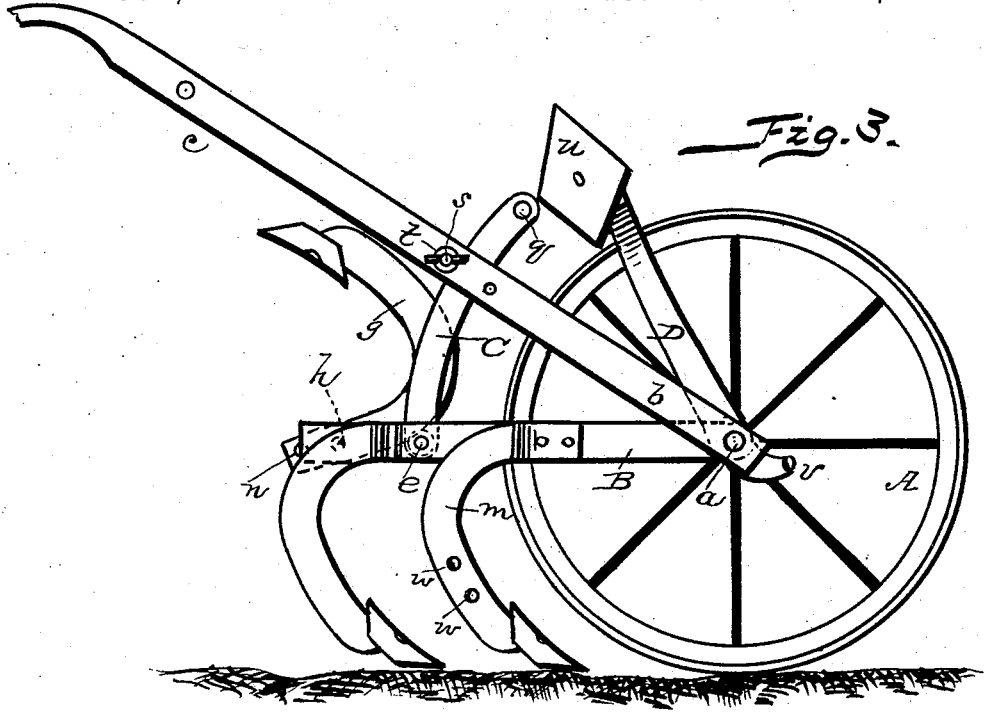
Figure 4:
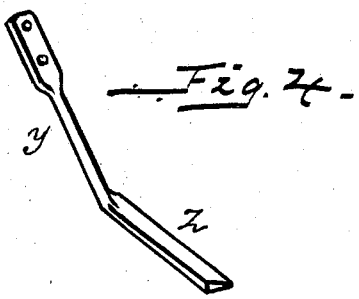

Figure 1, represents a vertical sectional view of my improved hand cultivator. Fig. 2, is a plan view of the same. Fig. 3 is a side view and Fig. 4 is a perspective view of one of the weed cutters used in connection with my device.

Referring by letter to the accompanying drawings, A, designates a transporting wheel, and $a$ the axle thereof. This axle is arranged between the forward ends $b$ $b$, of two handles $c$, $c$, of the cultivator.

B, B, represent the main cultivator beams; the forward ends of which are pivoted to the axle aforesaid and on either side of the hub $d$ of said wheel. These cultivators are connected to one another at their rear portion by a transverse bolt $e$, upon which are two sleeves $f$, $f$, on either side of a central standard $g$; which latter is pivoted at $h$ between the rearwardly projecting ends $i$, $i$, of the two inclined brace bars $j$, $j$, which latter are also connected at $k$, $k$, to the transverse bolt $e$, and at their forward ends $l$, $l$, to the main cultivator beams as shown in Fig. 1.

To the sides of each main beam of the cultivator are bolted the standards $m$, $m$, the same being rigid therewith. The central standard is provided with a transverse perforation $n$ which registers with perforations $o$, $o$, in the projecting ends $i$, $i$, of the angular brace bars aforesaid; and adapted to receive a spring pin $p$, whereby said standard is locked in position for operation.

C, C, indicate a pair of curved bars, the lower ends of which are pivoted to the bolt $e$ and the upper ends thereof are connected to one another by a transverse bolt $q$. These curved arms pass through a loop $r$ of a binding bolt $s$, which is connected to each handle and is provided with a tightening or thumb screw or nut $t$.

D, D, represent two curved bars; the rear portion of which is pivoted to the axle and the forward end thereof is provided with a plow point or shovel $u$. These curved bars straddle the transporting wheel and the extreme rear ends thereof are provided with lateral lugs $v$, $v$, which are designed to engage the handles or main cultivator beams whereby the shovel is gaged. These standards of the cultivator are provided with the usual cultivator teeth and the two outside standards are provided with perforations $w$, $w$, to receive bolts passed through the upper end of standards $y$, of a pair of weed cutters $z$, said cutters being bolted to said standards when it is desired to convert the device into a weed cutter.

It will be seen that the cultivators can be adjusted simply by loosening the thumb nuts, raising or lowering the teeth as desired and again tightening said nuts when the beams will be firmly held in place to the handles.

In using the plow point in running a furrow, the cultivator teeth are elevated and held thus by the binding nuts and in covering the furrow, the central standard is turned upon its pivot, after the spring pin has been withdrawn, and the tooth thereof becomes inactive. This permits of the teeth on the standards of the main beams to cover the furrow. At the same time the curved bars D D, with their plow point are elevated and thrown back, resting upon the transverse bar or bolt $q$. It will be further observed that when the cultivators are in use the plow point is thrown up and is inactive and when the plow point is in use the cultivator teeth are raised by the curved arms C, C, and are held elevated by the loop bolt and thumbnuts aforesaid, and a cultivator as herein described is durable, simple in operation and at the same time cheap to manufacture.

I claim—

1. In a cultivator of the class described the combination with the handles and transporting wheel of the curved arms pivoted at their lower ends to the cultivator frames or beams; the upper ends connected by the transverse bolt and the loop bolts passing through said handles and having the thumb nuts all substantially as described.

2. In a cultivator of the character described a rear central standard pivoted at its upper portion to the frame work of the cultivator and adapted to be thrown out of its normal position as set forth.

3. In a cultivator of the character described the combination with the handles and transporting wheel of the pivoted bars straddling the wheel and provided at their rear ends with lateral lugs adapted to engage the handles or cultivator beams when the bars are in position for plowing said bars having the plow point as set forth.

4. A hand cultivator comprising a transporting wheel; a pair of handles journaled on the axle thereof, a pivoted standard straddling said wheel and curved arms pivoted at their lower ends to the cultivator and adjustably clamped to the handles a pivoted central standard arranged between two angular brace bars as shown and means substantially as described for gaging the depth of the plow point, all as shown and described.

In testimony whereof I affix my signature in presence of two witnesses.

CHARLES J. ABBOTT.

Witnesses:
D. A. ELIOT,
J. LICHTENAUER.